United States Patent Office 3,205,968
Patented Sept. 14, 1965

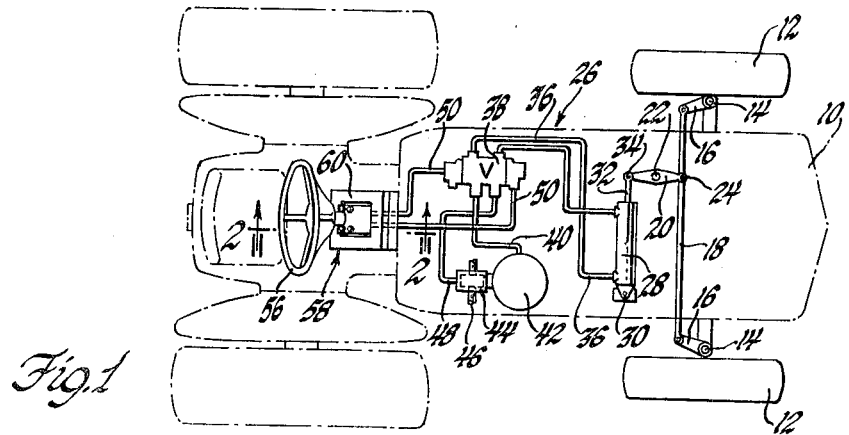

3,205,968
ADJUSTABLE STEERING WHEEL PARTICULARLY FOR HYDROSTATIC STEERING SYSTEMS
Jack H. Rose, Livonia, Mich., assignor to Massey-Ferguson, Inc., Detroit, Mich., a corporation of Maryland
Filed June 14, 1962, Ser. No. 202,476
15 Claims. (Cl. 180—79.2)

This invention relates to a selectively adjustable steering wheel assembly and the combination therewith of a fluid pressure power steering system of the hydrostatic type.

In certain vehicles in use today, such as argicultural tractors and motorized scrapers used in the earth-moving industry, it is often desirable if not necessary for the vehicle operator to steer the vehicle from a sitting position on certain occasions and from a standing position in others. For example, with cultivating or corn picking equipment attached to an agricultural tractor, the tractor operator will desire to stand for a better view of the rows of crops being worked upon. In the case of earth-moving scrapers, for another example, the scraper operator is often called upon to stand while steering the vehicle to obtain a better view of and thereby accurately gauge and control the depth of a cut being made by the scraper cutting edges, and to accurately control the position of the apron and ejector mechanism of the scraper in dumping and spreading a load of material therefrom. Since the steering systems of vehicles of this type, whether of the mechanical or power operated or assisted variety, include a steering wheel assembly mounted in a fixed location normally designed for actuation thereof by the vehice operator in a sitting position, it will be readily apparent that operation of the steering wheel assembly can and does become somewhat awkward from a standing position.

In view of the foregoing considerations, the present invention is directed to a steering wheel assembly including a manually rotatable steering wheel, and is particularly characterized by an adjustable pivotal mounting for the steering wheel assembly whereby the latter may be selectively swung through a sufficiently large arc to accommodate effective manipulation thereof either from a sitting or a standing position, and brake means for selectively holding the steering wheel assembly in any selected position thereof while being operable to release the steering wheel assembly for pivotal adjustment thereof.

More specifically, the present invention is particularly characterized by a rotatable steering wheel in a housing which is pivotally mounted on a support adapted to be secured to a vehicle, a brake rod fixed to the housing for pivotal movement therewith, manually operable lever means pivotally mounted on the aforementioned support and connected to opposite end coils of a torsion brake spring surrounding the brake rod, and spring means connected between the support and the lever means to continuously urge the latter in one direction to frictionally engage the torsion brake spring with the brake rod to hold the housing in a selected position while permitting movement of the lever means in an opposite direction to release the torsion brake spring for manual adjustment of the housing about its pivot axis.

While the adjustable steering wheel assembly aforementioned may be utilized to advantage in strictly mechanical steering systems, the present invention particularly contemplates the combination thereof with a fluid pressure operated power steering system of the hydrostatic type and, in this respect, is particularly characterized by the fact that the usual hand pump component of such a hydrostatic steering system is mounted within the aforementioned housing and operatively connected for drive thereof to the rotatable steering wheel, the housing, the pump enclosed therein and the steering wheel carried thereby being adjustably pivotally connected to the support as aforementioned, and flexible conduit means connecting the housing and the output from the pump to the other components of such a hydrostatic steering system including in particular the main selector valve means thereof. Thus, since the sole connection from the pump and steering wheel housing to the other components of the steering system is through the aforementioned flexible conduit means, the latter readily accommodates pivotal adjustment of the housing through a relatively great range of arcuate movement sufficient to accommodate operation of the steering wheel and the steering system from either a sitting or a standing position.

For a further description of the invention, reference will be made to the drawing in which:

FIGURE 1 is a plan view of a vehicle illustrating a preferred embodiment of the invention;

FIGURE 2 is an enlarged sectional view taken on line 2—2 of FIGURE 1;

FIGURE 3 is a view, partially broken away and in section to illustrate certain details of the invention, taken on line 3—3 of FIGURE 2;

FIGURE 4 is an enlarged fragmentary sectional view taken on line 4—4 of FIGURE 2; and FIGURE 5 is a view taken on line 5—5 of FIGURE 4.

Referring now to the drawings, the numeral 10 schematically indicates a tractor having suitable wheel means including a pair of wheels 12 dirigibly mounted for steering movement on the vehicle in the usual manner as by the kingpins 14 and steering arms 16 operatively interconnected by the connecting rod 18. An arm 20 is suitably pivotally connected at 22 to the vehicle, and has one end thereof pivotally connected at 24 to the connecting rod as shown. Movement of the arm 20 and connecting rod 18 and, hence, steering action of the wheels 12 is accomplished through a fluid pressure actuated power steering system of the hydrostatic type indicated generally at 26.

The steering system 26 comprises the usual extensible and retractable double acting steering jack having its cylinder member 28 pivotally connected at 30 to a fixed portion of the vehicle and its piston rod 32 pivotally connected as at 34 to the other end of the arm 20. The opposite ends of the steering jack to either side of the usual piston secured to the piston rod are connected through the hydraulic conduits 36 to a conventional closed center selector valve mechanism 38 including a conventional spool valve axially shiftable from a neutral position blocking flow of fluid through the conduits 36 and at least two different shifted positions respectively permitting flow of operating fluid through one of the conduits 36 to one end of the steering jack and exhaust of fluid from the other end thereof through the other conduit as will be readily apparent to those acquainted with the art. The selector valve 38 is connected through the conduit 40 to a reservoir 42 communicating with a power pump 44 preferably driven from the vehicle engine as indicated schematically by the shaft 46, the output of the pump being communicated to the selector valve through the conduit 48. Thus, with the selector valve 38 in its neutral position as aforementioned, there is no flow whatsoever between the steering jack and the selector valve 38 through the conduits 36 but, upon the selector valve being moved to one of its shifted positions aforementioned, operating fluid under pressure is supplied from the pump 44 through the selector valve 38 in a manner to be hereinafter described to one of the conduits 36 while fluid is exhausted from the other conduit 36 through the selector valve 38 and conduit 40 to the reservoir. As a result, the steering jack either extends or retracts to steer wheels 12.

The opposite ends of the selector valve 38 and the shiftable spool valve disposed therein are respectively connected by the flexible conduits 50 to a conventional manually operable pump mechanism 51 mounted in a housing 52 with the driving element of the pump mechanism drivingly connected in the usual manner to a steering shaft 54 suitably rotatably journaled in the housing and connected to the steering wheel 56, the housing 52, steering shaft 54 and steering wheel 56 forming components of the adjustable steering wheel assembly indicated generally at 58.

At this juncture, it is to be noted that the hydrostatic fluid pressure steering system indicated generally at 26 may be constructed in accordance with any one of various known and commercially available systems of this type. Since such systems are known and available, details of various components of the system and particularly the selector valve 38 and pump mechanism disposed in housing 52 have not been illustrated in the interest of clarity and in order not to obscure the invention. Suffice it to say that, and as is well known in the art, such systems are characterized by the fact that manipulation of the steering wheel 56 in one direction or the other activates the hand pump mechanism within the housing 52 to pump fluid correspondingly through one or the other of the conduits 50 to one end of selector valve 38 resulting in shifting movement of the spool member of the selector valve in one or the other corresponding direction. Shifting of the spool member in this manner with the power pump 44 operating results in the latter supplying fluid under pressure through conduit 48 to the selector valve, which fluid then circulates through the other conduit 50, the hand pump 51, the one conduit 50 initially pressurized by the latter, the selector valve again and one of the conduits 36 to one end of the steering jack, while fluid is exhausted from the other end of the steering jack through the other conduit 36 and selector valve 38 to the reservoir thereby to steer the vehicle in one direction or the other. In the event the power pump is not operating, the fluid pumped through one of the conduits 50 by the pump mechanism as aforedescribed not only shifts the valve spool member but also supplies the corresponding conduit 36 to actuate the steering jack, exhaust from the steering jack flowing back to the hand pump mechanism through the selector valve and the conduit 50 which is not pressurized by the hand pump mechanism.

Referring now particularly to FIGURES 2 through 5, the steering assembly 58 further comprises a support member 60 adapted to be suitably rigidly secured on the vehicle in a location convenient to the operator's seat as indicated in FIGURE 1. The aforementioned housing 52 enclosing the hand pump mechanism of the power steering system and in which the steering shaft 54 is rotatably journaled is suitably rigidly secured to a yoke member 62, the opposite legs 64 of which are suitably pivotally journaled coincidently as indicated at 66 to opposite side walls 68 of the support member 60. It will be noted from FIGURE 2 that the yoke member 62 between the legs thereof is suitably curved in relation to its pivot axis for projection through and pivotal movement within an opening 70 in an upper portion of the support member, flanges 72 at opposite ends of the yoke member being engageable with respective portions of the support member adjacent the opening therein to limit pivoting movement of the assembly.

The opposite ends of an arcuate brake rod 74 are suitably rigidly secured as indicated in FIGURE 2 to spaced portions of one leg 64 of the yoke member and projects downwardly therefrom. The brake rod has a center of curvature substantially coincident with the pivot axis 66 of the yoke member, and is of circular cross section throughout a major portion, at least, of its length. An axially coiled torsion brake spring 76 is wound about the circular portion of the brake rod, and has its opposite end coils pinned as indicated at 78 or otherwise suitably secured to the hub 80 of a manually operable control lever 82 suitably pivotally mounted as indicated at 84 to one side wall 68 of the support member. The axis of the pivotal connection 84 of the control lever is parallel to that of the connection 66 of the yoke member to the support member 60, and is spaced therefrom a distance substantially equal to the radius of curvature of brake rod 74. The connections 78 of the end coils of the torsion brake spring are at points substantially equidistantly spaced from and on opposite sides of the pivotal mounting 84 of the lever 82, which extends through an opening 86 in the support member for manipulation by the vehicle operator. A lock spring 88 is connected between one side wall 68 of the support member and an intermediate portion of the control lever 82, and continuously urges the latter counterclockwise in FIGURE 2 and the lever hub 80 counterclockwise in FIGURE 5 to twist the coiled torsion brake spring into firm frictional locking engagement with the brake rod. However, manual movement of the control lever clockwise in FIGURE 2 and the lever hub 80 clockwise in FIGURE 5 against the influence of the lock spring 88 functions to relax the torsion brake spring about the brake to enable the yoke member 62 to be manually adjusted about the pivotal connections 66 to a selected position, at which time mere release of the control lever and the consequent retraction of the lock spring firmly re-engages the torsion brake spring with the brake rod to hold the yoke member and steering assembly in its selected position.

Thus, the lock spring 88 functions to maintain the torsion brake spring 76 in firm gripping frictional engagement with the brake rod 74 at any time that the control lever 82 is not manually drawn from the position of FIGURE 2. Manipulation of the control lever as aforedescribed is all that is required to release the yoke member for adjustment of the steering assembly. The flexible conduits 50 which form the sole operative connection between the steering assembly 58 and the remaining components of the hydrostatic power steering system 26 readily accommodate the required degree or range of arcuate movement of the yoke member and the housing 52 and steering shaft 54 carried thereon.

The embodiments of the invention in which an exclusive property or privilege is claimed are defined as follows.

I claim:

1. In a vehicle steering wheel assembly of the type comprising support means adapted to be fixed on a vehicle, a steering wheel housing, and a manually operable steering wheel rotatably mounted on said housing; the improvement comprising means pivotally mounting said housing on said support means for adjustment relative thereto between two extreme positions, and brake means carried respectively by said support means and said housing and being engageable and disengageable respectively to hold said housing in either of said extreme positions and any one of a plurality of selected positions therebetween on said support means and to release said housing for adjustment of the position thereof relative to said support means.

2. The steering wheel assembly according to claim 1 in which said brake means comprises a brake member fixed for pivotal movement with said housing, and spring means mounted on said support means for frictional engagement and disengagement with said brake member.

3. The steering wheel assembly according to claim 1 in which said brake means comprises a brake rod fixed for pivotal movement with said housing, and coiled spring means surrounding said brake rod and mounted on said support means for frictional gripping engagement and disengagement with said brake rod.

4. The steering wheel assembly according to claim 1 in which said brake means comprises a brake rod fixed for pivotal movement with said housing and including an arcuately curved portion having a center of curvature substantially coincident with the pivot axis of said housing on said support means, and spring means surrounding said portion of said brake rod and mounted on said support means for frictional gripping engagement and disengagement with said portion of said brake rod.

5. The steering wheel assembly according to claim 1 further comprising, in combination therewith, a hydrostatic vehicle power steering system of the type including fluid pressure operated steering jack means, means including selector valve means for supplying and exhausting operating fluid under pressure to and from said jack means, pump means mounted in said housing and connected to said steering wheel, and flexible conduit means connecting said housing and pump means to said valve means to control positioning of the latter.

6. In a vehicle steering wheel assembly of the type comprising support means adapted to be fixed on a vehicle, a steering wheel housing, and a manually operable steering wheel rotatably mounted on said housing; the improvement comprising means pivotally mounting said housing on said support means for adjustment relative thereto, brake means carried respectively by said support means and said housing and being engageable and disengageable respectively to hold said housing in a selected position on said support means and to release said housing for adjustment of the position thereof relative to said housing, and manually operable means selectively controlling engagement and disengagement of said brake means.

7. The steering wheel assembly according to claim 6 in which said brake means comprises a first brake member fixed for pivotal movement with said housing, and a second brake member engageable and disengageable therewith, and wherein said manually operable means selectively controlling engagement and disengagement of said brake means comprises manually operable lever means, means pivotally mounting said lever means on said support means, said second brake member being mounted on said lever means, and yieldable means continuously urging said lever means in one direction to engage said brake members to hold said housing in a selected position, said lever means being movable in the opposite direction to disengage said brake members to permit pivotal adjustment of said housing relative to said support means.

8. The steering wheel assembly according to claim 6 in which said brake means comprises a brake rod fixed for pivotal movement with said housing, and coiled brake spring means surrounding said brake rod, and wherein said manually operable means selectively controlling engagement and disengagement of said brake means comprises manually operable lever means, means piovtally mounting said lever means on said support means, means connecting spaced coils of said brake spring means to said lever means at points spaced from the pivot axis of the latter, and spring means connected between said support means and said lever means to continuously urge the latter in one direction to frictionally engage said brake spring means with said brake rod to hold said housing in a selected position, said lever means being movable in the opposite direction against the influence of said spring means to relax said brake spring means to permit pivotal adjustment of said housing relative to said support means.

9. The steering wheel assembly according to claim 8 in which the respective points of connection of said spaced coils of said brake spring means to said lever means are substantially equidistantly spaced from and on opposite sides of the pivot axis of said lever means.

10. The steering wheel assembly according to claim 6 in which said brake means comprises a brake rod fixed for pivotal movement with said housing and including an arcuately curved portion having a center of curvature substantially coincident with the pivot axis of said housing on said support means, and an axially coiled torsion brake spring surrounding said portion of said brake rod, and wherein said manually operable means selectively controlling engagement and disengagement of said brake means comprises manually operable lever means, means pivotally mounting said lever means on said support means for movement about an axis substantially parallel to the pivot axis of said housing, means connecting the end coils of said torsion brake spring to said lever means at points spaced from the pivot axis of the latter, and spring means connected between said support means and said lever means to continuously urge the latter in one direction to frictionally engage said torsion brake spring with said portion of said brake rod to hold said housing in a selected position, said lever means being movable in the opposite direction against the influence of said spring means to relax said torsion brake spring to permit pivotal adjustment of said housing relative to said support means.

11. The steering wheel assembly according to claim 10 in which the pivot axis of said lever means is spaced from the pivot axis of said housing a distance substantially equal to the radius of curvature of said portion of said brake rod.

12. The steering wheel assembly according to claim 11 in which the respective points of connection of said end coils of said torsion brake spring to said lever means are substantially equidistantly spaced from and on opposite sides of the pivot axis of said lever means.

13. In combination, a steerable vehicle having a hydrostatic power steering system of the type including fluid pressure operated steering jack means, means including selector valve means for supplying and exhausting operating fluid under pressure to and from said jack means, pump means including a housing therefor, flexible conduit means connecting said housing and pump means to said selector valve means to control positioning of the latter, a manually operable steering wheel rotatably supported within said housing and connected to said pump means to control actuation of the latter, means pivotally mounting said housing on said vehicle for movement relative thereto between two extreme positions, and brake means carried respectively by said housing and vehicle and being engageable and disengageable respectively to hold said housing in either of said extreme positions and any one of a plurality of selected positions therebetween relative to said vehicle and to release said housing for manual adjustment of the position thereof relative to said vehicle.

14. The combination according to claim 13 in which said brake means comprises a brake rod fixed for pivotal movement with said housing and including an arcuately curved portion having a center of curvature substantially coincident with the pivot axis of said housing, and an axially coiled torsion brake spring surrounding said portion of said brake rod, and further comprising manually operable lever means, means pivotally mounting said lever means on said vehicle for movement about a pivot axis of said housing and spaced therefrom a distance substantially equal to the radius of curvature of said portion of said brake rod, means connecting the end coils of said torsion brake spring to said lever means at points spaced from said pivot axis of the latter, and spring means connected between said vehicle and said lever means to continuously urge the latter in one direction to frictionally engage said torsion brake spring with said portion of said brake rod to hold said housing in a selected position, said lever means being pivotally movable in the opposite direction against the influence of said spring means to relax said torsion brake spring to permit manual adjustment of said housing about the pivot axis thereof.

15. In combination, a steerable vehicle having a hydrostatic power steering system of the type including fluid pressure operated steering jack means, means including selector valve means for supplying and exhausting operating fluid under pressure to and from said jack means, pump means communicating with said selector valve means to control positioning of the latter, a steering wheel housing, a manually operable steering wheel rotatably supported on said housing and connected to said pump means to control actuation of the latter, means pivotally mounting said housing on said vehicle for movement relative thereto between two extreme positions, and brake means carried respectively by said housing and vehicle and being engageable and disengageable respectively to hold said housing in either of said extreme positions and any one of a plurality of selected positions therebetween relative to said vehicle and to release said housing for manual adjustment of the position thereof relative to said vehicle.

References Cited by the Examiner

UNITED STATES PATENTS

| | | | |
|---|---|---|---|
| 2,356,924 | 8/44 | Froelich | 188—67 |
| 2,896,733 | 7/59 | Rockwell | 180—79.2 |
| 2,918,135 | 12/59 | Wittren | 180—79.2 |
| 3,032,134 | 5/62 | Banker | 180—79.2 |

A. HARRY LEVY, *Primary Examiner.*

PHILIP ARNOLD, *Examiner.*